(Model.)

5 Sheets—Sheet 1.

D. VAUGHAN.
Millstone Dressing Machine.

No. 237,216. Patented Feb. 1, 1881.

Witnesses:
P. Walter Fowler,
R. K. Evans

Inventor:
David Vaughan,
by A. H. Evans & Co
his Atty's.

(Model.)

5 Sheets—Sheet 2.

D. VAUGHAN.
Millstone Dressing Machine.

No. 237,216. Patented Feb. 1, 1881.

Witnesses:
T. Walter Fowler,
R. K. Evans

Inventor:
David Vaughan
by A. N. Evans & Co.
Attys (Model.)

D. VAUGHAN.
Millstone Dressing Machine.

No. 237,216.   Patented Feb. 1, 1881.

Witnesses:
T. Walter Fowler
R. K. Evans

Inventor:
David Vaughan
by N. H. Evans & Co.
Attys (Model.)

D. VAUGHAN.
Millstone Dressing Machine.

No. 237,216.  Patented Feb. 1, 1881.

5 Sheets—Sheet 4.

Witnesses:
T. Walter Fowler,
R. K. Evans

Inventor;
David Vaughan
by
A. N. Evans & Co.
Attys (Model.)

D. VAUGHAN.
Millstone Dressing Machine.

No. 237,216. Patented Feb. 1, 1881.

Witnesses:
T. Walter Fowler,
R. K. Evans

Inventor;
David Vaughan
by A. H. Evans & Co
Attys

UNITED STATES PATENT OFFICE.

DAVID VAUGHAN, OF BANGOR, WISCONSIN.

MILLSTONE-DRESSING MACHINE.

SPECIFICATION forming part of Letters Patent No. 237,216, dated February 1, 1881.

Application filed November 11, 1880. (Model.)

*To all whom it may concern:*

Be it known that I, DAVID VAUGHAN, of Bangor, in the county of La Crosse and State of Wisconsin, have invented certain Improvements in Machines for Dressing Millstones; and I hereby declare the following to be a full, clear, and exact description thereof, reference being had to the accompanying drawings, making part of this specification, in which—

Figure 1:
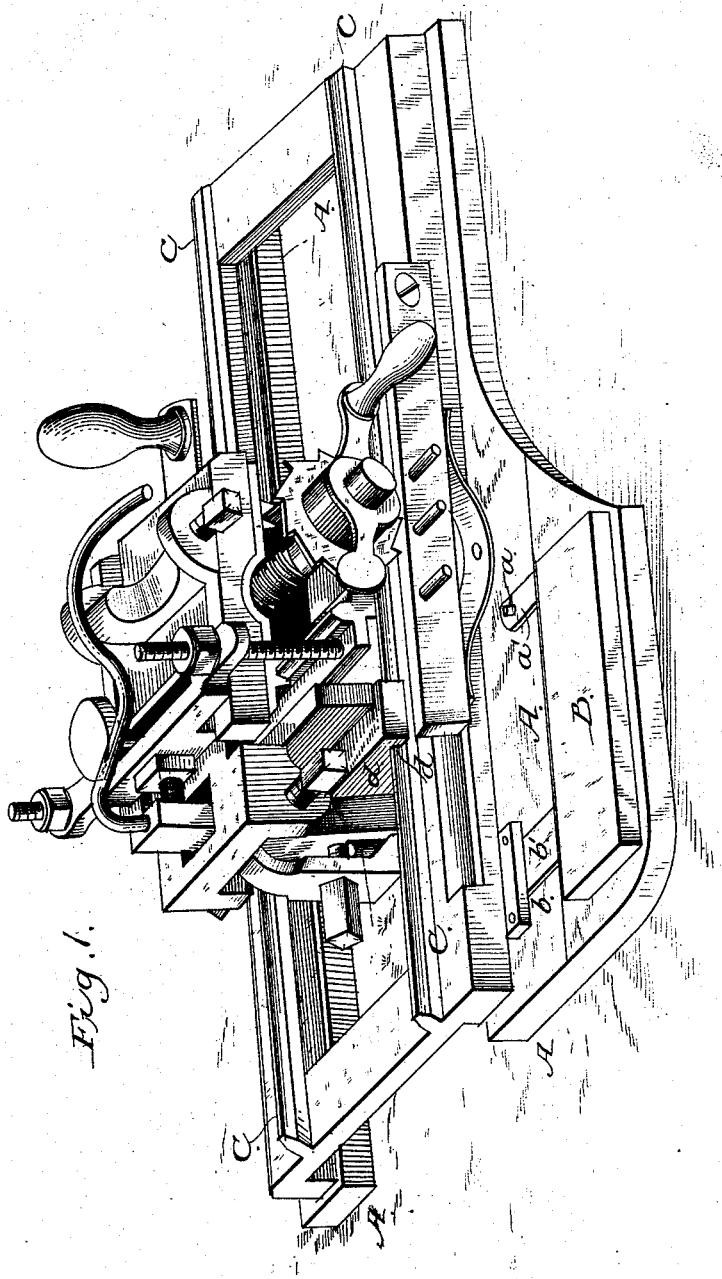
Figure 2:
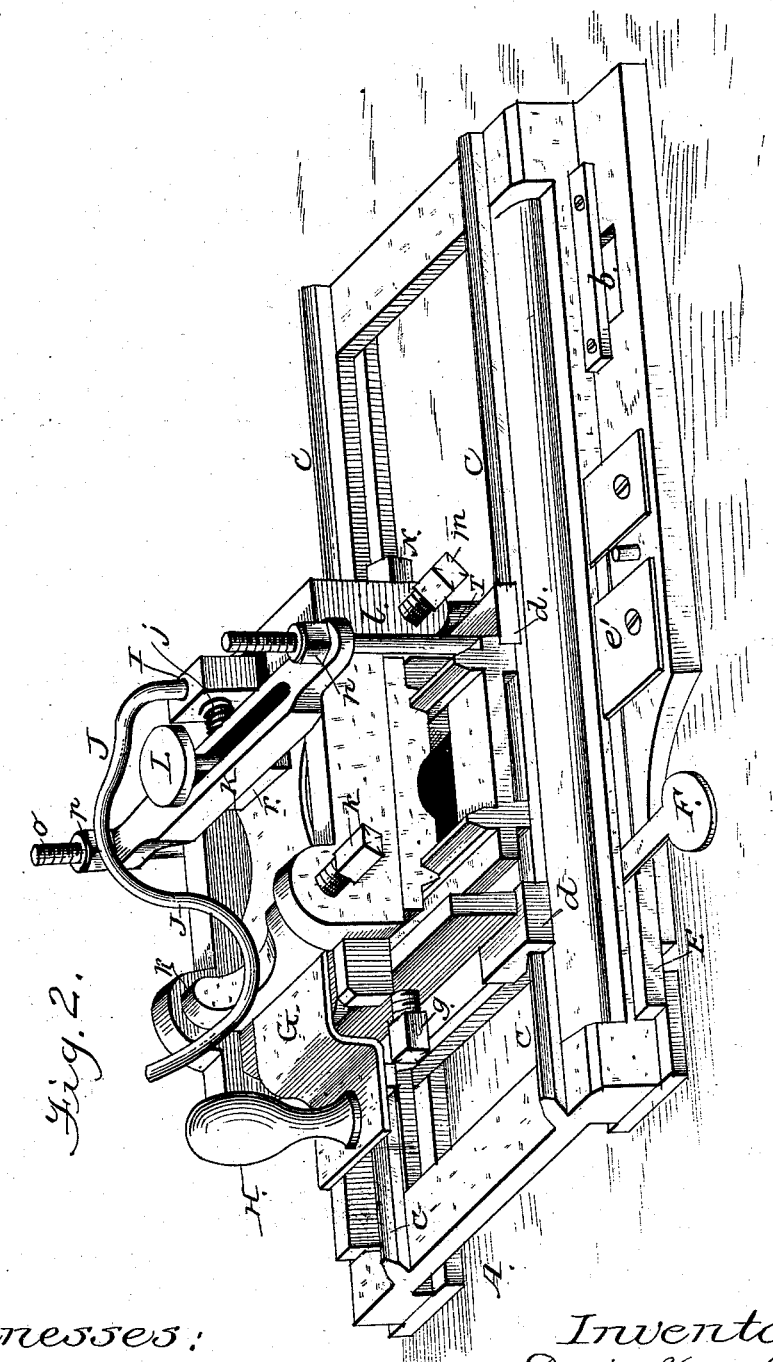
Figure 3:
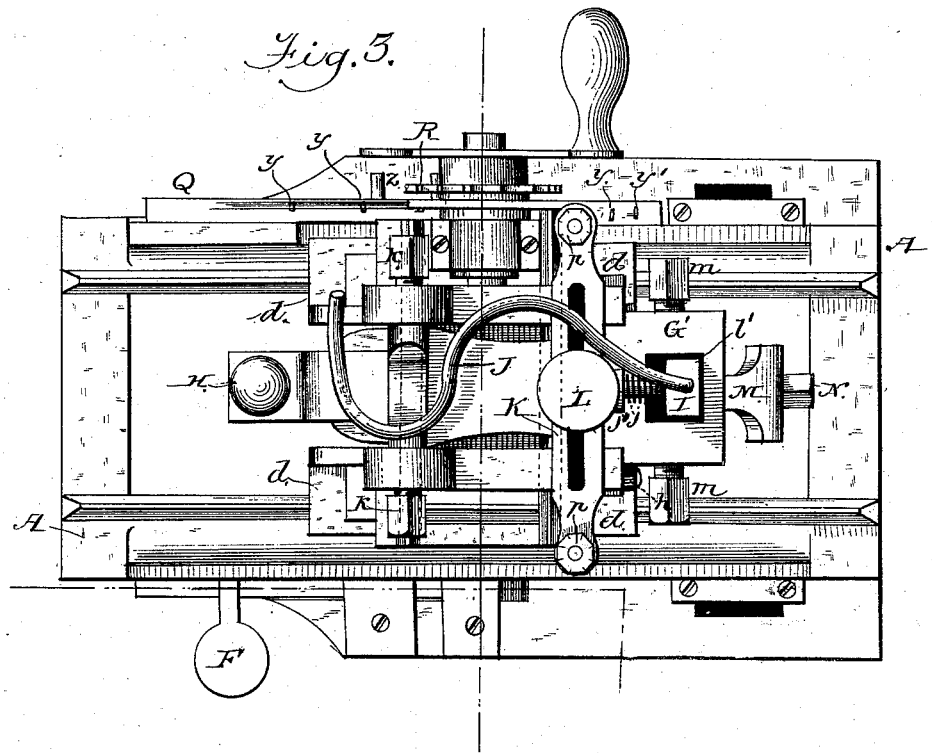
Figure 4:
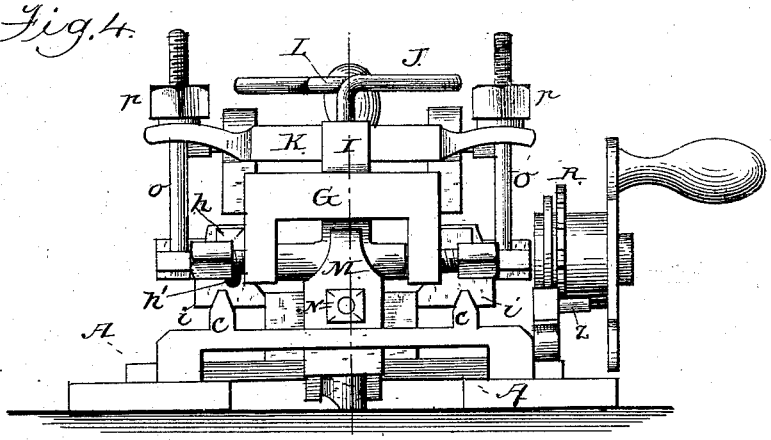
Figure 5:
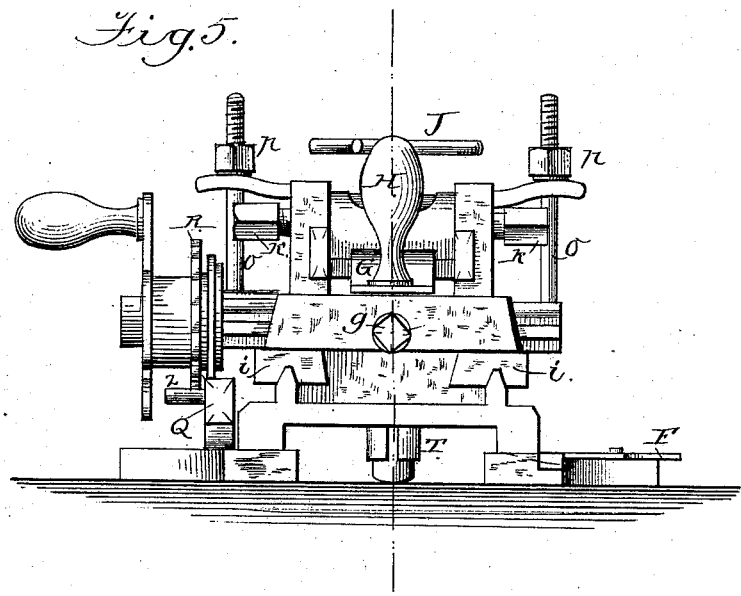
Figures 6, 10:
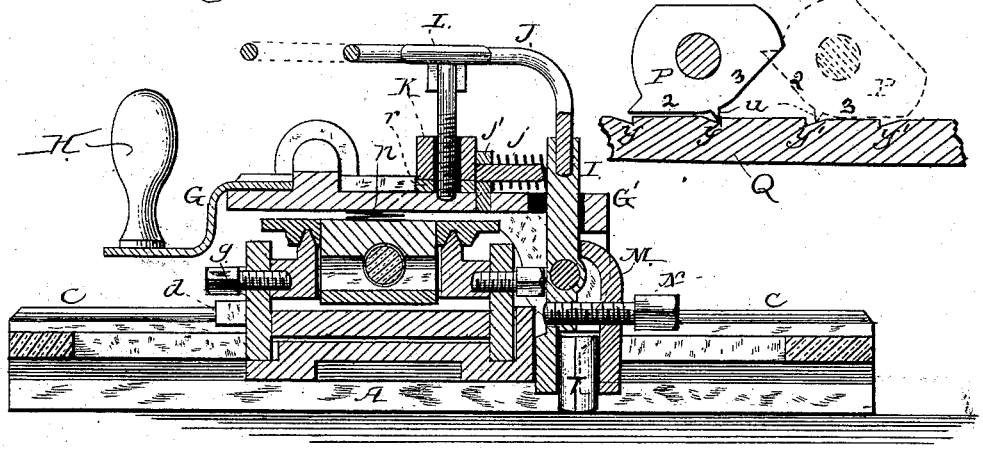
Figure 7:
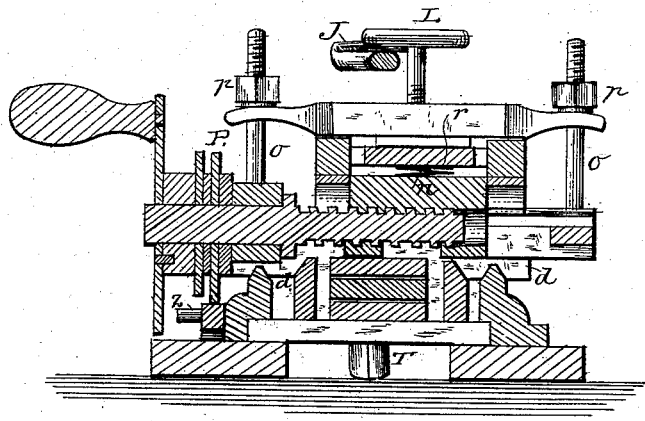
Figure 8:
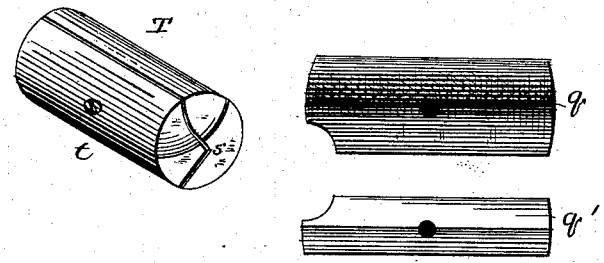
Figure 9:

Figure 1 is a perspective view, looking at the side of the machine from which the head of the feed-screw protrudes. Fig. 2 is a perspective view of the opposite side from that shown in Fig. 1. Fig. 3 is a plan view of the machine. Fig. 4 is a front view of the same. Fig. 5 is a rear view of the same. Fig. 6 is a longitudinal sectional view. Fig. 7 is a transverse vertical sectional view. Fig. 8 is a view of the diamond-thimble. Fig. 9 is a section on the line $y\ y$ of Fig. 3. Fig. 10 is a view of the eccentric tripping-fly.

My invention relates to that class of machines for dressing millstones wherein a reciprocating tool is used to cut the stone; and my invention consists, first, in two removable bars or weights, to be attached at will on each side of the bed-rails to assist in holding the machine down to the stone; secondly, in an adjusting mechanism set into the bed-rails, whereby the machine is caused to lie parallel to any plane in which work is to be done; thirdly, in combining the tool-carriage and tool-holder with an adjustable yoke, whereby the angle of the cut of the diamond can be controlled; fourthly, in a certain combination of devices, as hereinafter more fully described, for operating variably the transverse feed-screw; fifthly, in a peculiarly-constructed adjustable vibrating spring-head for holding the diamond-clamp; sixthly, in a diamond-clamp consisting of a short solid cylinder divided longitudinally on lines radiating from its cross-sectional center, forming an obtuse angle.

In order that those skilled in the art may make and use my invention, I will proceed to describe the manner in which I have carried it out.

In the said drawings, A A represent the bed-plates of my machine, and which rest upon the stone. On these bed-plates are pins $a$ and sockets $b$, to engage with projections $a'$ and $b'$, on removable bars or weights B, (see Fig. 1,) to more securely hold the machine to the stone. The bed-plates are provided with two longitudinal rails, C C, on which reciprocates the tool-carrying carriage supported on the grooved feet $d\ d$.

In machines of this class it is highly desirable that the location or set of the machine shall be in a plane precisely parallel to the face or furrow of the stone on which the work is to be done, and this condition I maintain by means of an adjusting mechanism constructed as follows:

In the flanges of the bed-plates are cut openings, in which are inserted die-plates D, provided with grooves having diagonal bottoms $e$, said grooves being covered by plates $e'$. Through the openings formed by the grooves pass rods E, having wedge-faced sections $f$ lying in the grooves and provided with bearings and a lever, F, by means of which the rods E are moved back and forth, and the wedge-section forces the surface of the die-plate downward, and thereby raises the machine to any extent desired within its limit of movement. The lower faces of the die-plates I prefer to cover with wood, as it lessens the tendency to slide on the stone.

The transversely-moving portion of the carriage is, for convenience of construction, permanently fastened to the remainder of the carriage, while the ways or track on which the transverse portion slides is swung on pivots $g$ and oscillates thereon, the oscillation being limited by bolts $h$ passing through slots $h'$ in the forward plate, $i$, of the main carriage.

The diamond-stock G is pivoted to the transverse carriage in the sides of the upright portions at $k$, and is provided at its rear end with a handle, H, and at its forward end with a slotted head, G', provided with downwardly-projecting ears $l\ l$, to sustain the diamond-clamp I by means of pivots $m\ m$, the neck of the diamond-clamp passing up through slot $l'$, and terminating in a serpentine lever, J, which passes to the rear of the carriage, near handle H. A coiled or other spring, $j$, has one end resting against a stud, $j'$, and the other end against the upper end of the neck of the diamond-clamp, so that its normal condition is in a vertical plane, the said clamp being moved from a vertical position by means of depressing-lever J and compressing-spring j. The entire stock G rests on a coiled or other spring, n, interposed between its lower surface and the bottom plate of the transverse carriage, and the relation of the stock to the said carriage is controlled by an adjustable yoke consisting of the two upright bars o o, rising from the transverse track-plate and connected at their tops by the slotted cross-bar K, secured by screw-nuts p p. Through the slot in bar K is an adjusting-screw, L, carrying a nut, r, interposed between the bar K and the top of the stock G, whereby, after the main adjustments of the machine are made, a supplemental and nicer adjustment of the stock may be made. By depressing one of the nuts p and raising the other the cutting-stock is rocked or crimped on either side to any desirable angle for the cutting-point to work.

The diamond-thimble is made of a short solid metal cylinder divided longitudinally on lines radiating from its cross-sectional center, forming an obtuse angle, so as to form two parts, q q', (see Fig. 8,) which are clamped together by means of the screw t, the diamond resting in the angle s. The diamond-thimble is secured to the head G' by means of the clamp M and screw N.

The automatic transverse feed is accomplished by means of an endless screw working through a nut in the transverse carriage, and having bearings in the transverse rail-plate. On the head of the endless screw is an eccentric fly, P, made with two sliding faces and a spur, u, as shown, which rests on a spring-bar, Q, lying alongside one of the longitudinal rails. The upper face of the spring-bar is provided with a series of notches, y y y' y', raking in opposite directions on opposite sides of the center, as shown. The two sliding surfaces of the fly P are tangential to different circles in the revolution of the said fly, the face 2 being on the circle of lesser diameter, while the face 3 is tangential to the circle of greater diameter. Outside of fly P, rigidly fixed to the head of the endless screw, is a toothed wheel, R, of such a diameter that when the fly P is on the sliding surface 2, the lesser distance from the axis of the screw, the said toothed wheel will drop down alongside of spring-bar Q sufficiently for the teeth to engage in a series of movable pins, z z, projecting from the side of the spring-bar, and when the fly is on the sliding surface 3 the toothed wheel will be raised and the spring-bar depressed, so the teeth will slide over the pins. The transfer of the fly from one sliding surface to another is accomplished by means of the spur u on the fly at the junction of the two surfaces, which always remains in contact with the spring-bar Q, and engages alternately, as the tool-carriage is reciprocated back and forth, with a notch, y, and a notch, y'. As the tool-carriage is retracted by being pulled toward the operator by means of handle H the spur catches in notch y, throws the fly on surface 2, thereby lowering the toothed wheel R, so that as it passes down the side of bar Q it engages with as many of the pins z as may be protruding, and through their agency is turned, thereby turning the endless screw and automatically feeding the transverse carriage, so that at the next forward movement the diamond point cuts a new portion of the surface of the stone. The pins z z are applied to the bar so that they may be pushed in at will, and as many or as few of them as are desired may be made to protrude, and the rapidity of the transverse feed is thereby governed.

The machine is operated as follows, the machine illustrated in the drawings being a left-hand machine: Run the transverse carriage to the right by means of the crank on the end of the endless screw, draw the tool-carriage back to the scarf of the stone, adjust the diamond, by means of the bed-rail, so that it will be on the feather-edge of the land, adjust the depth of the cut by means of the vertical adjusting-screw L. Now seize the handle H with the right hand and push forward the tool-carriage, meantime resting the thumb on lever J. This operation makes a cut on the stone. Then press the thumb on lever J and draw back the tool-carrier. The pressure on lever J raises the diamond clear of the stone as the tool-carrier is retracted and saves the wear on it. As the carrier is drawn back the toothed wheel engages in any predetermined number of pins that may be protruding from the spring-bar, turns the endless screw, and sets the diamond over for a new cut. If the red-staff leaves high red spots on the land, which will require facing off altogether, put back all the pins in the spring-bar but one, run the tool-carrier back and forth in short strokes, letting the diamond fall on the certain high spots, and nowhere else. After a given spot is thus dressed reverse the feed-screw so that the diamond will be on the feather-edge of the land, set a proper number of pins, and go over the whole land again, whereby the face is kept true.

Having thus described my invention, what I claim as new, and desire to secure by Letters Patent, is—

1. In a millstone-dressing machine, a vibrating diamond-carrying clamp pivoted at or near its central portion to a sliding frame, and mechanism, substantially as described, for flexibly holding the diamond point in contact with the stone to be dressed, for the purpose set forth.

2. In a millstone-dressing machine, a vibrating diamond-carrying clamp pivoted at or near its central portion to a sliding frame, and mechanism, substantially as described, for operating said clamp to lift the diamond point free of the stone on the return-stroke of the sliding frame, for the purpose described.

3. The stock G, provided with a slotted head, G', having ears l l, in combination with the diamond-thimble clamp I, pivots m m, lever J, coiled spring $j$, and stud $j'$, all constructed, arranged, and operated substantially as and for the purpose described.

4. In a millstone-dressing machine, the diamond-carrying stock G, pivoted to the transverse carriage, in combination with the transverse carriage and transverse rail-plate pivoted at right angles to the pivots of the stock G, substantially as set forth.

5. In combination, with the rocking stock G, the adjustable yoke, composed of the upright bars $o$ $o$ and slotted cross-bar K, substantially as and for the purpose described.

6. The pivoted stock G, provided with the yielding spring-support $n$, in combination with the slotted cross-bar K, adjusting-screw L, and nut $r$, all constructed, arranged, and operating as set forth.

7. The diamond-thimble constructed as described, consisting of a small cylinder divided longitudinally on lines radiating from its cross-sectional center, forming an obtuse angle, as set forth.

8. In a machine for dressing millstones, the automatic feed mechanism consisting of the endless screw bearing the eccentric fly P, having the two sliding surfaces 2 3 and spur $u$, and the toothed wheel R, in combination with the spring-bar Q, provided with a series of notches, $y$ $y'$, on its upper edge and a series of pins, $z$ $z$, on its sides, substantially as and for the purpose described.

9. In a feed mechanism for a machine for dressing millstones, a bar, Q, provided with a series of movable pins, $z$ $z$, substantially as set forth, whereby a variable feed is secured, as described.

10. In a machine for dressing millstones, the combination of a tool-holder vibrating through a vertical plane, a stock vibrating through a horizontal plane, and a transverse carriage rail plate vibrating through a horizontal plane at right-angles to the plane of vibration of the stock, for the purpose set forth.

DAVID VAUGHAN.

Witnesses:
  D. D. JONES,
  J. G. JENKINS.